United States Patent
Szurdi et al.

(10) Patent No.: US 12,294,592 B2
(45) Date of Patent: *May 6, 2025

(54) AUTOMATED EXTRACTION AND CLASSIFICATION OF MALICIOUS INDICATORS

(71) Applicant: Palo Alto Networks, Inc., Santa Clara, CA (US)

(72) Inventors: Janos Szurdi, Sunnyvale, CA (US); Daiping Liu, Sunnyvale, CA (US); Jun Wang, Fremont, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/373,481

(22) Filed: Sep. 27, 2023

(65) Prior Publication Data

US 2024/0031383 A1 Jan. 25, 2024

Related U.S. Application Data

(63) Continuation of application No. 17/185,760, filed on Feb. 25, 2021, now Pat. No. 11,882,130.

(51) Int. Cl.
*H04L 9/40* (2022.01)
*G06N 5/025* (2023.01)
*G06N 20/00* (2019.01)

(52) U.S. Cl.
CPC ......... *H04L 63/1416* (2013.01); *G06N 5/025* (2013.01); *G06N 20/00* (2019.01)

(58) Field of Classification Search
CPC ... H04L 63/1416; H04L 63/145; H04L 63/20; G06F 21/64; G06F 21/12; G06N 5/025; G06N 20/00
See application file for complete search history.

(56) References Cited

U.S. PATENT DOCUMENTS

| | | |
|---|---|---|
| 10,135,862 B1 | 11/2018 | McClintock |
| 10,778,702 B1 | 9/2020 | Huang |
| 11,882,130 B2 * | 1/2024 | Szurdi ..................... G06F 21/64 |
| 2017/0187741 A1 | 6/2017 | Desch |
| 2019/0268305 A1 | 8/2019 | Xu |
| 2019/0364061 A1 | 11/2019 | Higbee |
| 2019/0372999 A1 | 12/2019 | Young |
| 2019/0379694 A1 | 12/2019 | Ben David |

(Continued)

OTHER PUBLICATIONS

Alves et al., Design of a Classification Model for Twitter-Based Streaming Threat Monitor, 2019 IEEE/IFIP International Conference on Dependable Systems and Networks Workshops, 2019, pp. 9-14.

(Continued)

*Primary Examiner* — Joseph P Hirl
*Assistant Examiner* — Thomas A Gyorfi
(74) *Attorney, Agent, or Firm* — Van Pelt, Yi & James LLP

(57) ABSTRACT

Techniques for generating actionable indicators of compromise (IOCs) are disclosed. A set of potential sources for IOCs are received. One or more candidate IOCs are extracted from at least one source included in the set of potential sources. An actionable IOC is automatically identified from the one or more candidate IOCs. The actionable IOC is provided to a security enforcement service.

31 Claims, 8 Drawing Sheets

(56) References Cited

U.S. PATENT DOCUMENTS

2020/0382537 A1    12/2020    Compton
2022/0027428 A1    1/2022    Sutton

OTHER PUBLICATIONS

Alves et al., Processing Tweets for Cybersecurity Threat Awareness, Information Systems 95, 2021.

Anupam Panwar, iGen: Toward Automatic Generation and Analysis of Indicators of Compromise (IOCs) using Convolutional Neural Network, Master's Thesis, Arizona State University, 2017.

Bridges et al., Cybersecurity Automated Information Extraction Techniques: Drawbacks of Current Methods, and Enhanced Extractors, 16th IEEE International Conference on Machine Learning and Applications, 2017, pp. 437-442.

Catakoglu et al., Automatic Extraction of Indicators of Compromise for Web Applications, 25th International World Wide Web Conference, 2016.

Dionísio et al., Cyberthreat Detection from Twitter Using Deep Neural Networks, arVix, Apr. 1, 2019.

Ghazi et al., A Supervised Machine Learning Based Approach for Automatically Extracting High-Level Threat Intelligence from Unstructured Sources, Proceedings—2018 International Conference on Frontiers of Information Technology, 2018.

Huang et al., Gossip: Automatically Identifying Malicious Domains from Mailing List Discussions, Asia CCS '17, 2017.

Husari et al., TTPDrill: Automatic and Accurate Extraction of Threat Actions from Unstructured Text of CTI Sources, ACSAC 2017, 2017, pp. 103-115.

Khandpur et al., Crowdsourcing Cybersecurity: Cyber Attack Detection Using Social Media, arXiv, Feb. 24, 2017.

Kristiansen et al., CTI-Twitter: Gathering Cyber Threat Intelligence from Twitter using Integrated Supervised and Unsupervised Learning, 2020 IEEE International Conference on Big Data (Big Data), 2020, pp. 2299-2308.

Le et al., Gathering Cyber Threat Intelligence from Twitter Using Novelty Classification, 2019 International Conference on Cyberworlds (CW), 2019, pp. 316-323.

Liao et al., Acing the IOC Game: Toward Automatic Discovery and Analysis of Open-Source Cyber Threat Intelligence, CCS'16, 2016, pp. 755-766.

Long et al., Collecting Indicators of Compromise from Unstructured Text of Cybersecurity Articles Using Neural-Based Sequence Labelling, Proceedings of the International Joint Conference on Neural Networks, 2019.

Niakanlahiji et al., IoCMiner: Automatic Extraction of Indicators of Compromise from Twitter, 2019 IEEE International Conference on Big Data (Big Data), 2019, pp. 4747-4754.

Sabottke et al., Vulnerability Disclosure in the Age of Social Media: Exploiting Twitter for Predicting Real-World Exploits, Proceedings of the 24th USENIX Security Symposium, 2015, pp. 1041-1056.

Verma et al., Analyzing Indicator of Compromises for Ransomware: Leveraging IOCs with Machine Learning Techniques, 2018 IEEE International Conference on Intelligence and Security Informatics (ISI), 2018, pp. 154-159.

Zhou et al., Automatic Identification of Indicators of Compromise Using Neural-Based Sequence Labelling, 32nd Pacific Asia Conference on Language, Information and Computation, 2018.

* cited by examiner

Cybercriminals have launched a phishing campaign to steal the login credentials of Rainbow Bank's customers. The attack was carried out through spam emails, where the perpetrators sent out several emails to the bank's customers telling them that their password needed to be changed.

The emails contained links to multiple fraudulent websites mimicking *rainbowbank.com*.The webpages looked exactly like *rainbowbank.com*, except that they were set up to ask for the username, the old password and a new password.

To make their attack inconspicuous, the criminal group registered multiple typosquatting domains such as *raInbowbank[.]com* and *rainb0bank[.]com*. When users opened the website, they might have missed the slight difference in the domain name. To make their attack worse, the phishers acquired valid certificates for their domain names. These certificates ensured that the browser displays a green lock icon providing users a sense of safety. We provide the full list of phishing URLs on https://pastebin.com/cWKZ98xx.

FIG. 5A

```
<div>
<p>Cybercriminals have launched a phishing campaign to steal the login
credentials of Rainbow Bank's customers. The attack was carried out
through spam emails, where the perpetrators sent out several emails to
the bank's customers telling them that their password needed to be
changed.</p><br/>
<br/>
<p>The emails contained links to multiple fraudulent websites mimicking
<i>rainbowbank.com</i>. The webpages looked exactly like
<i>rainbowbank.com</i>, except that they were set up to ask for the
username, the old password and a new password.</p><br/>
<br/>
<p>To make their attack inconspicuous, the criminal group registered
multiple typosquatting domains such as <i>ra<span style="color:
red">l</span>nbowbank[.]com</i> and <i>rainb<span style="color:
red">0</span>bank[.]com</i>. When users opened the website, they
might have missed the slight difference in the domain name.To make
their attack worse, the phishers acquired valid certificates for their
domain names. These certificates ensured that the browser displays a
green lock icon providing users a sense of safety. We provide the full list
of phishing URLs on <a href = "https://pastebin.com/cWKZ98xx"
>https://pastebin.com/cWKZ98xx</a>.</p><br/>
<br/></div>
```

FIG. 5B

AUTOMATED EXTRACTION AND CLASSIFICATION OF MALICIOUS INDICATORS

CROSS REFERENCE TO OTHER APPLICATIONS

This application is a continuation of U.S. patent application Ser. No. 17/185,760 entitled AUTOMATED EXTRACTION AND CLASSIFICATION OF MALICIOUS INDICATORS filed Feb. 25, 2021 which is incorporated herein by reference for all purposes.

BACKGROUND OF THE INVENTION

Nefarious individuals attempt to compromise computer systems in a variety of ways. As one example, such individuals may embed or otherwise include malicious software ("malware") in email attachments and transmit (or cause the malware to be transmitted) to unsuspecting users. When executed, the malware compromises the victim's computer. Some types of malware will instruct a compromised computer to communicate with a remote host. For example, malware can turn a compromised computer into a "bot" in a "botnet," receiving instructions from and/or reporting data to a command and control (C&C) server under the control of the nefarious individual. One approach to mitigating the damage caused by malware is for a security company (or other appropriate entity) to attempt to identify malware and prevent it from reaching/executing on end user computers. Another approach is to try to prevent compromised computers from communicating with the C&C server. Unfortunately, malware authors are using increasingly sophisticated techniques to obfuscate the workings of their software. Accordingly, there exists an ongoing need for improved techniques to detect malware and prevent its harm.

BRIEF DESCRIPTION OF THE DRAWINGS

Various embodiments of the invention are disclosed in the following detailed description and the accompanying drawings.

FIG. 5A illustrates a portion of user-visible text.

FIG. 5B illustrates source code corresponding to the text shown in FIG. 5A.

DETAILED DESCRIPTION

Figure 1:
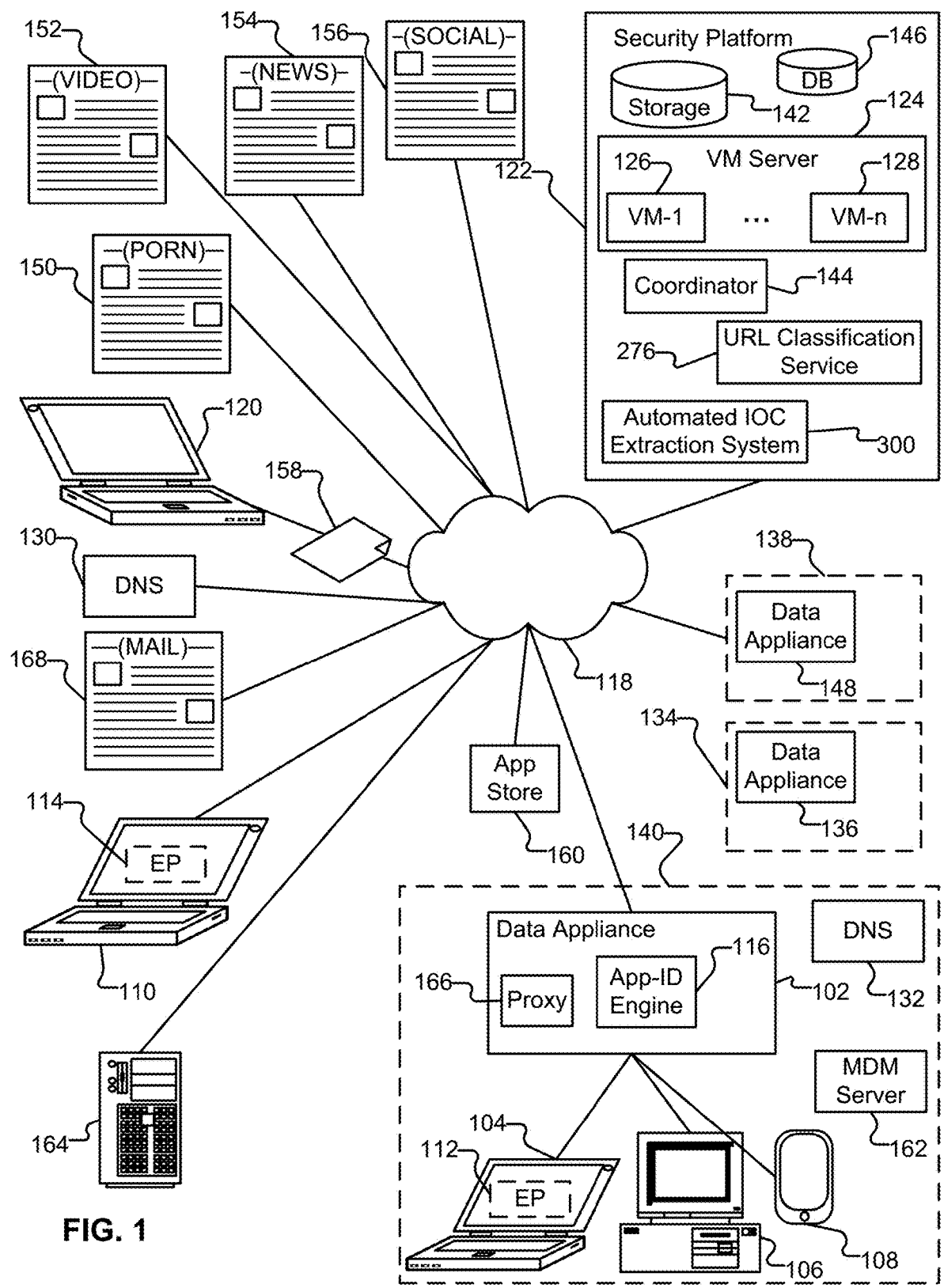
FIG. 1 illustrates an example of an environment in which policies are enforced.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

I. Overview

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as one or more software applications on various types of devices, such as computer servers, gateways, network/routing devices (e.g., network routers), and data appliances (e.g., security appliances or other types of special purpose devices), and in various implementations, certain operations can be implemented in special purpose hardware, such as an ASIC or FPGA.

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies.

Security devices (e.g., security appliances, security gateways, security services, and/or other security devices) can include various security functions (e.g., firewall, anti-malware, intrusion prevention/detection, Data Loss Prevention (DLP), and/or other security functions), networking functions (e.g., routing, Quality of Service (QoS), workload balancing of network related resources, and/or other networking functions), and/or other functions. For example, routing functions can be based on source information (e.g., IP address and port), destination information (e.g., IP address and port), and protocol information.

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform state-based packet inspection in which each packet is examined within the context of a series of packets associated with that network transmission's flow of packets. This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques. For example, certain newer firewalls sometimes referred to as advanced or next generation firewalls can also identify users and content (e.g., next generation firewalls). In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls). For example, Palo Alto Networks' next generation firewalls enable enterprises to identify and control applications, users, and content—not just ports, IP addresses, and packets—using various identification technologies, such as the following: APP-ID for accurate application identification, User-ID for user identification (e.g., by user or user group), and Content-ID for real-time content scanning (e.g., controlling web surfing and limiting data and file transfers). These identification technologies allow enterprises to securely enable application usage using business-relevant concepts, instead of following the traditional approach offered by traditional port-blocking firewalls. Also, special purpose hardware for next generation firewalls (implemented, for example, as dedicated appliances) generally provide higher performance levels for application inspection than software executed on general purpose hardware (e.g., such as security appliances provided by Palo Alto Networks, Inc., which use dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' VM Series firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)). For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

II. Example Environment

FIG. 1 illustrates an example of an environment in which policies are enforced. Included in the environment are two Domain Name System (DNS) servers (130 and 132). Typically, when attempting to access a URL, a web browser (e.g., executing on a client device) forwards a request to a DNS server (e.g., DNS server 130) to resolve the domain name of the URL into a corresponding (Internet Protocol (IP) address. In response to receiving a valid IP address for a requested domain name, the client can connect to a corresponding content server (e.g., site 152) using the IP address to request a desired resource. The content server responds with the requested resource if the requested resource is available at the content server or responds with an error message or with a redirect to another content server if the requested resource is not available at the content server.

Also shown in FIG. 1 is an example enterprise network 140 which belongs to an entity hereinafter referred to as ACME Corporation. Enterprise network 140 includes an enterprise DNS server 132. Enterprise DNS server 132 is configured to resolve enterprise domain names into IP addresses, and is further configured to communicate with one or more external DNS servers (e.g., DNS server 130) to resolve domain names. Also included within enterprise network 140 are example client devices 104-108, which are a laptop computer, a desktop computer, and a tablet (respectively). Laptop 104 and desktop computer 106 are owned by ACME, and tablet 108 is personally owned by an ACME employee hereinafter referred to as Alice. Client device 110 is a laptop computer located outside of enterprise network 140.

Client devices, such as client devices 104-110 can each execute a variety of applications. The term "application" is used throughout the Specification to collectively refer to programs, bundles of programs, manifests, packages, etc., irrespective of form/platform. An "application" (also referred to herein as a "sample") can be a standalone file (e.g., a calculator application having the filename "calculator.apk" or "calculator.exe") and can also be an independent component of another application (e.g., a mobile advertisement software development kit (SDK) or library embedded within the calculator app).

"Malware" as used herein refers to an application that engages in behaviors, whether clandestinely or not (and whether illegal or not), of which a user does not approve/would not approve if fully informed. Examples of malware include Trojans, viruses, rootkits, spyware, hacking tools, keyloggers, etc. One example of malware is a desktop application that collects and reports to a remote server the end user's location (but does not provide the user with location-based services, such as a mapping service). Another example of malware is a malicious Android Application Package .apk (APK) file that appears to an end user to be a free game, but stealthily sends SMS premium messages (e.g., costing $10 each), running up the end user's phone bill. Another example of malware is an Apple iOS flashlight application that stealthily collects the user's contacts and sends those contacts to a spammer.

Other forms of malware can also be mitigated using the techniques described herein (e.g., ransomware). And, while examples provided throughout the Specification generally refer to malicious applications, techniques described herein can also be used in various embodiments with respect to other kinds of applications (e.g., adware, goodware, etc.). In some cases, an end user of an application (e.g., Alice) may approve of functionality provided by an application, while another entity (e.g., ACME) may not. As two examples, Alice may intentionally have gambling applications or pornographic-themed applications installed on her tablet 108. In contrast, ACME may have corporate policies prohibiting employees from using enterprise network 140 for such applications. As will be described in more detail below, ACME can enforce policies against the use of such applications within enterprise network 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, etc.).

Data appliance 102 (also included within enterprise network 140) is configured to enforce policies regarding communications between client devices, such as client devices 104 and 106, and nodes outside of enterprise network 140 (e.g., reachable via one or more external networks collectively depicted as network cloud 118). One example of a policy is a rule prohibiting any access to site 150 (a pornographic website) by any client inside enterprise network 140. Another example of a policy is a rule prohibiting access to social networking site 156 by clients between the hours of 9 am and 6 pm. Yet another example of a policy is a rule allowing access to video streaming website 152, subject to a bandwidth or other consumption constraint. Yet another example of a policy is one that logs the time spent by employees using social networking sites (e.g., where there is an understanding that employees will sometimes visit such sites throughout the workday, but should limit such activities to fifteen minutes per day). Policies can be made to apply to all devices equally, and can also be applied at more granular levels. For example, access to social networking site 156 can be permitted to anyone in the ACME marketing department (e.g., users having associated group identifiers indicating their affiliation with the marketing department), and unfettered bandwidth for use with video streaming website 152 can be granted to specific users (e.g., the CEO), to groups of users (e.g., the ACME sales department), and/or to individual/groups of clients (e.g., prohibiting access to video streaming site 152 on production servers). Access to sites (e.g., news site 154) can be explicitly permitted (e.g., a rule allowing access to site 154 via URL ("www.examplenews.com") or category ("NEWS")), and can also be permitted by virtue of not being prohibited (e.g., "access to any site not prohibited is allowed," e.g., allowing access to web mail site 168 without needing to explicitly name the site in the rule).

Other types of policies can also be enforced, such as ones governing traffic shaping, quality of service, and/or routing (e.g., with respect to a given domain, a pattern including a domain (e.g., *.examplenews.com), a category associated with a domain, other hostname-associated information (e.g., URL), IP address range, etc.). Yet other examples of policies include security policies such as ones requiring the scanning for threats in incoming (and/or outgoing) email attachments, screening of website content, scanning files exchanged through instant messaging programs, and/or other file transfers. In some embodiments, data appliance 102 is also configured to enforce policies with respect to traffic that stays within enterprise network 140.

In various embodiments, data appliance 102 executes a DNS proxy service 166 (described in more detail below). When a client device (e.g., client device 108) attempts to communicate with a network resource (e.g., video streaming website 152), a DNS request is received by DNS proxy service 166, which provides a response back to client device 108. As applicable, the response is cached by data appliance 102.

In various embodiments, other devices are also included in enterprise network 140, such as a mobile device management (MDM) server 162, which is in communication with data appliance 102. MDM server 162 communicates with mobile devices to determine device status and to report (e.g., periodically) such mobile device status information to data appliance 102. MDM server 162 can be configured to report the presence of malicious applications installed on client devices, and/or can be configured to receive indications of which applications are malicious (e.g., from data appliance 102, from security platform 122, or combinations thereof). In some embodiments, data appliance 102 is configured to enforce policies against client devices based on information received from MDM server 162. For example, if a client device is determined to have malware installed on it (or other types of unapproved applications), data appliance 102 (working in cooperation with MDM server 162) can deny the client device access to certain enterprise resources (e.g., an Intranet) while allowing other client devices (which do not have malware installed on them) access to those resources.

Although illustrated as a single element in FIG. 1, enterprise network 140 can comprise multiple networks, any/each of which can include one or multiple data appliances or other components that embody techniques described herein. For example, the techniques described herein can be deployed by large, multi-national companies (or other entities) with multiple offices in multiple geographical locations. And, while client devices 104-108 are illustrated in FIG. 1 as connecting directly to data appliance 102, it is to be understood that one or more intermediate nodes (e.g., routers, switches, and/or proxies) can be and typically are interposed between various elements in enterprise network 140.

Figure 2A:
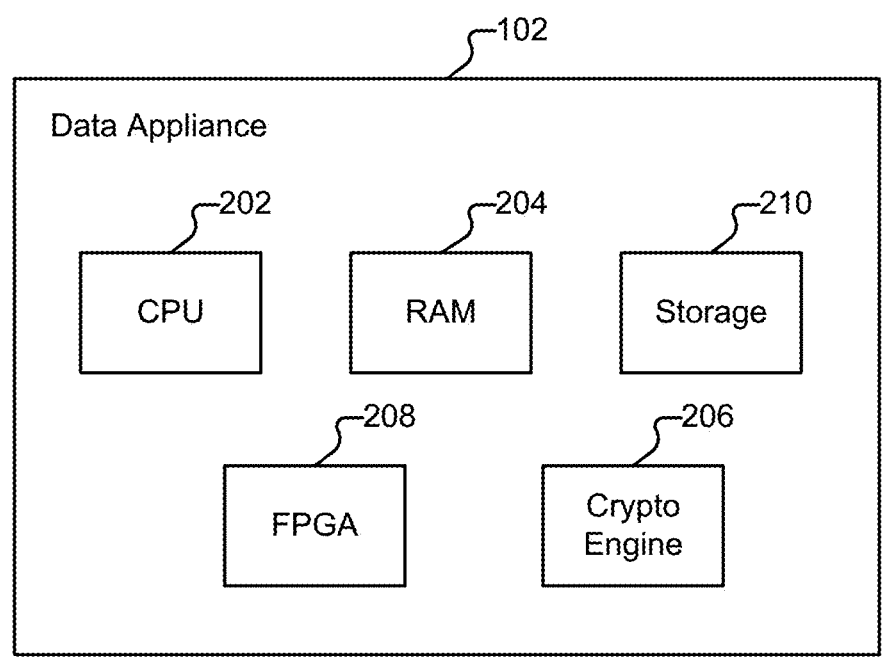
FIG. 2A illustrates an embodiment of a data appliance.

An embodiment of a data appliance is shown in FIG. 2A. The example shown is a representation of physical/hardware components that are included in data appliance 102, in various embodiments. Specifically, data appliance 102 includes a high performance multi-core Central Processing Unit (CPU) 202 and Random Access Memory (RAM) 204. Data appliance 102 also includes a storage 210 (such as one or more hard disk drives or solid state storage units), which can be used to store policy and other configuration information, as well as other information such as signatures and hostname/URL categorization information. In various embodiments, data appliance 102 stores (whether in RAM 204, storage 210, and/or in other appropriate locations) information used in monitoring enterprise network 140 and implementing disclosed techniques. Examples of such information include application identifiers, content identifiers, user identifiers, requested URLs, IP address mappings, etc. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general purpose computer, a computer server, a gateway, and/or a network/routing device. In some embodiments, at least some services described as being provided by data appliance 102 are instead (or in addition) provided to a client device (e.g., client devices 104 or 110) by software executing on the client device (e.g., endpoint protection applications 112 and 114).

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine 116 which is configured to identify an application (e.g., using various application signatures for identifying applications based on packet flow analysis). For example, application identification engine 116 can determine what type of traffic a session involves, such as Web Browsing—Social Networking; Web Browsing—News; SSH; and so on.

Figure 2B:
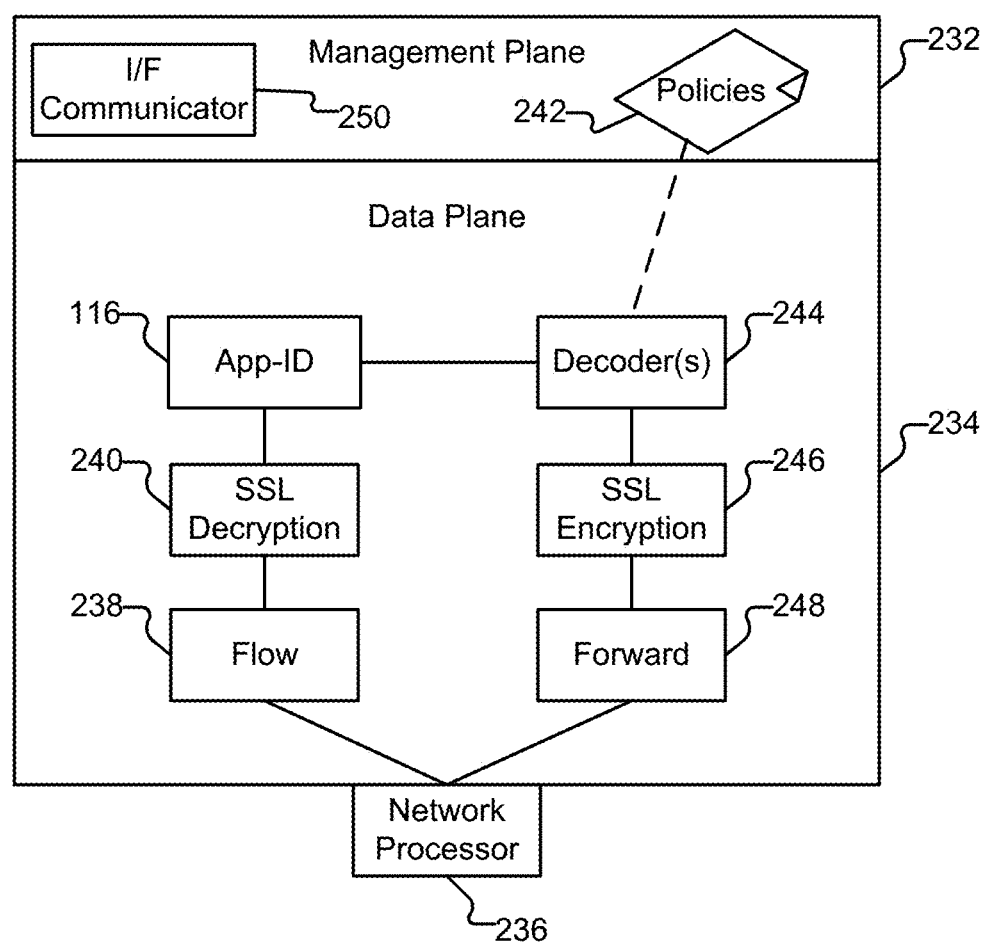
FIG. 2B illustrates logical components of an embodiment of a data appliance.

FIG. 2B is a functional diagram of logical components of an embodiment of a data appliance. The example shown is a representation of logical components that can be included in data appliance 102 in various embodiments. Unless otherwise specified, various logical components of data appliance 102 are generally implementable in a variety of ways, including as a set of one or more scripts (e.g., written in Java, python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 140. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 116 is configured to determine what type of traffic a session involves. As one example, application identification engine 116 can recognize a GET request in received data and conclude that the session requires an HTTP decoder. In some cases, e.g., a web browsing session, the identified application can change, and such changes will be noted by data appliance 102. For example a user may initially browse to a corporate Wiki (classified based on the URL visited as "Web Browsing—Productivity") and then subsequently browse to a social networking site (classified based on the URL visited as "Web Browsing—Social Networking"). Different types of protocols have corresponding decoders 244. Based on the determination made by application identification engine 116, the packets are sent to an appropriate decoder 244. Decoder 244 is configured to assemble packets (which may be received out of order) into the correct order, perform tokenization, and extract out information. Decoder 244 also performs signature matching to determine what should happen to the packet. As needed, SSL encryption engine 246 can re-encrypt decrypted data. Packets are forwarded using a forward module 248 for transmission (e.g., to a destination).

As also shown, policies 242 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. As also shown in FIG. 2B, an interface (I/F) communicator 250 is provided for management communications (e.g., via (REST) APIs, messages, or network protocol communications or other communication mechanisms.

Figure 2C:
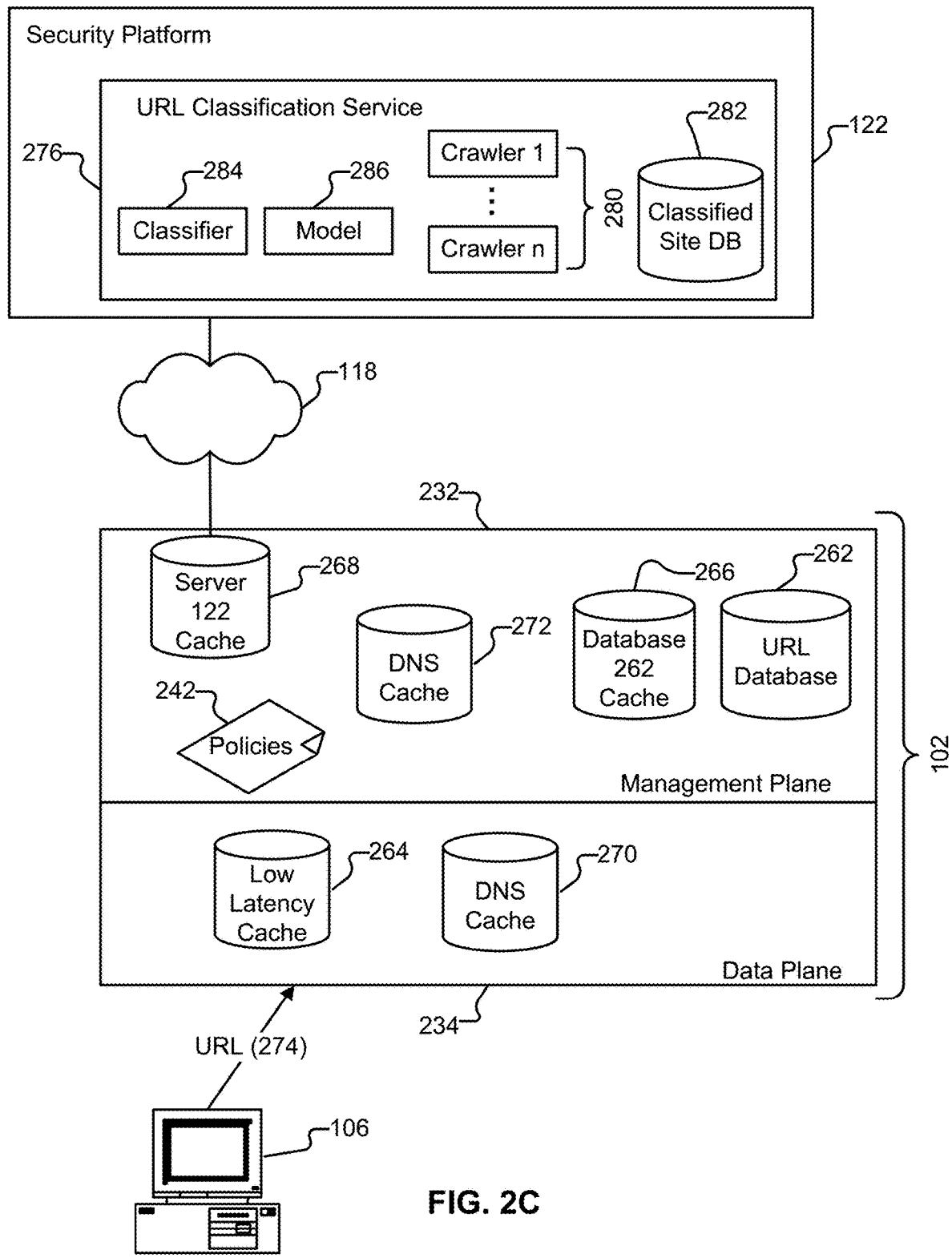
FIG. 2C illustrates an embodiment of a data appliance.

FIG. 2C illustrates an embodiment of a data appliance. As previously explained, in various embodiments, data appliance 102 includes a management plane 232 and a data plane 234. The management plane is responsible for managing user interactions, such as by providing one or more user interfaces for configuring policies (242), reporting problems, and viewing log data. The data plane is responsible for managing data, such as by performing packet processing (e.g., to extract URLs) and session handling. In various embodiments, a scheduler is responsible for managing the scheduling of requests (e.g., as presented by data plane 234 to management plane 232, or as presented by management plane 232 to a remote security platform 122).

URL Filtering

As mentioned above, one task performed by data appliance 102 is URL filtering. Specified in data appliance 102 is a set of policies 242, some of which govern the types of websites that ACME employees may access, and under what conditions. As one example, included in data appliance 102 is a policy that permits employees to access news-related websites. Another policy included in data appliance 102 prohibits, at all times, employees from accessing pornographic websites. Also included in data appliance 102 is a database (262) of URLs and associated categories (e.g., with bing.com being categorized as a "search engine" and with gmail.com being categorized as "web mail"). Other information can also be associated with the URLs in database 262 instead of or in addition to category information, and that other information can be used in conjunction with policy enforcement.

In some embodiments, database 262 (or at least some portions thereof) is provided by a third party, such as through a subscription service. In such a scenario, it is possible that instead of the URLs being directly stored in database 262, a transformation is applied to the URLs prior to storage. As one example, MD hashes of URLs can be stored in database 262, rather than the URLs themselves. The URLs stored in database 262 (or transformations thereof) represent the top n URLs for which access is most likely to be sought by users of client devices, such as client device 104, where n can be configured based on the computing and other resources available to data appliance 102. As one example, an embodiment of database 262 includes 20 million URLs and is stored in storage 210. Database 262 can be periodically refreshed/maintained, such as by security platform 122 transmitting daily (or another timescale) database updates to data appliance 102 (e.g., as a content package).

In various embodiments, data appliance 102 includes various caches (e.g., 264-272), loaded into RAM 204. In some embodiments, all or some of caches 264-272 are omitted from data appliance 102 and the processing described herein is adapted accordingly. In other embodiments, additional caches are included in data appliance 102, as applicable. Additional details regarding components shown in FIG. 2C are provided below.

When a user of client device 106 (an employee referred to hereinafter as "Bob") attempts to engage in activities such as web surfing, communications from and to client device 106 pass through data appliance 102. As one example, suppose Bob has launched a web browser application on client device 106 and would like to visit an arbitrary web page. Data appliance 102 is configured to evaluate the URL of the site Bob would like to visit (e.g., URL 274) and determine whether access should be permitted.

Suppose Bob would like to visit site 154, the website of a national newspaper, and enters that URL into his browser ("www.examplenews.com"). In some embodiments, the URL (274) is evaluated by data appliance 102 as follows. In the first stage of the evaluation, the data plane (234) consults cache 264 for the presence of URL 274 (the results of which are indicative of whether data appliance 102 has previously received a request to access site 154 within cache resource constraints). If the URL is present in cache 264, the associated category that is also stored in cache 264 is used to enforce any applicable policies 242 (e.g., allowing Bob access to site 154). If the URL is not present in cache 264, a temporary entry is inserted into cache 264 indicating that the URL is being resolved. As one example, a URL being resolved is assigned a temporary category of "UNRESOLVED." Additional requests received by data appliance 102 for access to site 154 (e.g., received from another user such as "Charlie," a user of client device 104) will be queued pending the resolution. In various embodiments, a timeout condition is placed on UNRESOLVED entries included in cache 264, such that if the entry is not updated within a specified period of time, the entry is removed.

Assuming URL 274 remains unresolved, data plane 234 sends a request to management plane 232 for an evaluation of URL 274. URL 274 is transformed as applicable (e.g., an MD5 hash of URL 274 is computed). For the remainder of the discussion of this example, no distinction will be made between a URL and the MD5 (or other transformation) of a URL, to aid in clarity. It is to be assumed that if database 262 stores MD5 hashes, the queries performed against (and corresponding operations) it will be performed using MD5 (or other applicable) transformations of URLs.

In some embodiments, cache 266 is evaluated for the presence of URL 274 (indicative of whether database 262 was previously queried for URL 274 within cache resource constraints). Suppose URL 274 is not present in cache 266. A query of database 262 is performed using URL 274. If it is assumed that URL 274 is present in database 262, the corresponding category NEWS is returned and ultimately provided to data plane 234, which will update the entry in cache 264 by changing the UNRESOLVED category to NEWS. The category will be used by the firewall to enforce any applicable rules. In this case, for example, Bob's attempt to access URL 274 with his browser would be permitted (his session would not be terminated by data appliance 102), because his request is associated with an attempt to access a NEWS site, which is a permissible use. Cache 266 is also updated to include the returned category and URL 274 (i.e., its MD5 hash).

Now suppose that a query of database 262 for URL 274 fails. The next phase of evaluation performed by the management plane is to consult cache 268 to see if URL 274 is present therein. Cache 268 is associated with queries performed by data appliance 102 against a set of one or more remote URL classification services. As with the previous phases, if URL 274 is present in cache 268, the corresponding category (e.g., "NEWS") will be returned as a result and can be used by the firewall in policy enforcement (and included in cache 264). If URL 274 is also absent in cache 268, one or more remote URL classification services, such as URL classification service 276, are queried.

In some embodiments, the URL classification service is an Amazon Cloud URL query server, which queries URL category information using a Trie structure lookup. In some embodiments, the URL classification service is made available by the provider of the contents of database 262, and contains URL information that supplements the information included in database 262 (e.g., by including many millions of additional URLs and corresponding categories). As one example, URL classification service 276 can be provided by security platform 122 (e.g., as component 276). A URL classification service can also be under the control of the owner of data appliance 102 or any other appropriate party. Further, a set of multiple URL classification services can be queried by data appliance 102, whether in parallel, in sequence (e.g., if a first queried URL classification service has no results, data appliance 102 contacts a different URL classification service), selectively, etc.

In various embodiments, URL classification service 276 is implemented using commodity server-class hardware. URL classification service 276 can also be constructed using a scalable, elastic architecture, and may comprise several distributed components, including components provided by one or more third parties (e.g., using Amazon Web Services, Microsoft Azure, and/or Google Cloud Platform). Further, when URL classification service 276 is referred to as performing a task, such as storing data or processing data, it is to be understood that a sub-component or multiple sub-components of URL classification service 276 (whether individually or in cooperation with third party components) may cooperate to perform that task. Functionality described herein as being provided by URL classification service 276 can be implemented in a variety of ways, including as a set of one or more scripts (e.g., written in Java, python, etc., as applicable).

URL classification service 276 uses a set of crawlers 280 to crawl sites (e.g., sites 150-156), extract metadata/content, and store information associated with the crawled sites in database 282. Examples of tools that can be used to crawl/extract content from sites include PageDump (WebKit), HtmlUnit, and jsoup. Database 282 is, in various embodiments, implemented using MongoDB. Example tables that can be included in database 282 are a crawl queue (of sites to be crawled), a crawl log (a history of sites crawled), a classification result (e.g., a to-publish category, invalid site, or no category), and a crawl content report (e.g., a summary of crawled sites, language, and number of pages crawled). The information extracted for a site (e.g., title, description, body text, keywords, inlinks, outlinks, language, etc.) is used (e.g., by classifier 284) to generate a feature vector (or set of feature vectors, as applicable). One example of a feature is whether or not any of the outlinks of a site lead to sites known to be classified as ADULT sites. Other example features variously include features related to body text, features related to metadata, features related to incoming links, and features related to the URL itself.

In various embodiments, different features included in a feature vector are used in conjunction with different types of machine learning approaches incorporated into a classification model, such as model 286. Examples of such machine learning approaches include Naïve Bayes, support vector machines, random forest, logistic regression, and gradient descent boosting trees. Classifier 284 uses a model, such as model 286, to classify a given site (e.g., as NEWS, ADULT, etc.) based on its associated feature vector. In various embodiments, a model such as model 286 is trained using a training set of manually labeled websites. As one example, sites such as netflix.com, hulu.com, and youtube.com (well known to provide video streaming services) can be included in the training set (labeled as "video streaming"). Categorizations determined using model 286 are stored in database 282. The contents of database 282 can be used for a variety of purposes, including generating database 262, and responding to queries.

In the event that URL 274 is also absent from URL classification service 276 (and any additional URL services available to data appliance 102 as applicable), a category of UNKNOWN will be returned and appropriate policies applied, based on the category, such as by blocking access to URL 274. Cache 264 can also be updated by switching the temporary category of UNRESOLVED to UNKNOWN. As with cache 266, cache 268 is updated based on results returned by URL classification service 276. In some embodiments, URLs with UNKNOWN categorization have a timeout, thus allowing for resolution of the categorization during a subsequent request.

Security Platform

Returning to FIG. 1, in various embodiments, security platform 122 is configured to provide a variety of services (including to data appliance 102), including analyzing samples (e.g., of documents, applications, etc.) for maliciousness, categorizing applications, categorizing domains/URLs/URIs, etc.

Suppose a malicious individual (using system 120) has created malware 158. The malicious individual hopes that a client device, such as client device 104, will execute a copy of malware 158, compromising the client device, and causing the client device to become a bot in a botnet. The compromised client device can then be instructed to perform tasks (e.g., cryptocurrency mining, or participating in denial of service attacks) and to report information to an external entity, such as command and control (C&C) server 164, as well as to receive instructions from C&C server 164, as applicable.

Suppose data appliance 102 has intercepted an email sent (e.g., by system 120) to client device 104 to which a copy of malware 158 has been attached. As an alternate, but similar scenario, data appliance 102 could intercept an attempted download by client device 104 of malware 158 (e.g., from a website). In either scenario, data appliance 102 determines whether a signature for the file (e.g., the email attachment or website download of malware 158) is present on data appliance 102. A signature, if present, can indicate that a file is known to be safe (e.g., is whitelisted), and can also indicate that the file is known to be malicious (e.g., is blacklisted).

If a signature for malware 158 (e.g., an MD5 hash of malware 158) is included in the set of signatures, data appliance 102 can prevent the transmission of malware 158 to client device 104 accordingly (e.g., by detecting that an MD hash of the email attachment sent to client device 104 matches the MD5 hash of malware 158). Security platform 122 can also provide to data appliance 102 a list of known malicious domains and/or IP addresses, allowing data appliance 102 to block traffic between enterprise network 140 and C&C server 164 (e.g., where C&C server 164 is known to be malicious). The list of malicious domains (and/or IP addresses) can also help data appliance 102 determine when one of its nodes has been compromised. For example, if client device 104 attempts to contact C&C server 164, such attempt is a strong indicator that client 104 has been compromised by malware (and remedial actions should be taken accordingly, such as quarantining client device 104 from communicating with other nodes within enterprise network 140).

If no signature for an attachment is found, in various embodiments, data appliance 102 is configured to provide the file for static/dynamic analysis, to determine whether it is malicious and/or to otherwise classify it. As one example, data appliance 102 can send a copy of malware 158 to security platform 122 for analysis. Security platform 122 can also (or instead) obtain copies of applications for evaluation from sources other than data appliance 102 (e.g., data appliances 136 and/or 148), and/or from other types of sources, such as a software distribution platform (also referred to herein as an "app store") 160. Example embodiments of app store 160 include Google Play, iOS App Store, Windows Store, and Amazon Appstore. In various embodiments, analysis of malware 158 is performed at least partially on premise (e.g., within enterprise network 140). And, analysis described herein as being performed by security platform 122 can also be performed, at least partially, by a malware analysis module included in data appliance 102.

Security platform 122 stores copies of received samples in storage 142 and analysis is commenced (or scheduled, as applicable). One example of storage 142 is an Apache Hadoop Cluster (HDFS). Results of analysis (and additional information pertaining to the applications) are stored in database 146. In the event an application is determined to be malicious, data appliance 102 can be configured to automatically block the file download based on the analysis result. Further, a signature can be generated for the malware and distributed (e.g., to other data appliances such as data appliances 136 and 148) to automatically block future file transfer requests to download the file determined to be malicious.

In various embodiments, security platform 122 comprises one or more dedicated commercially available hardware servers (e.g., having multi-core processor(s), 16G+ of RAM, gigabit network interface adaptor(s), and hard drive(s)) running typical server-class operating systems (e.g., Linux). Security platform 122 can be implemented across a scalable infrastructure comprising multiple such servers, solid state drives, and/or other applicable high-performance hardware. Security platform 122 can comprise several distributed components, including components provided by one or more third parties. For example, portions or all of security platform 122 can be implemented using the Amazon Elastic Compute Cloud (EC2) and/or Amazon Simple Storage Service (S3). Further, as with data appliance 102, whenever security platform 122 is referred to as performing a task, such as storing data or processing data, it is to be understood that a sub-component or multiple sub-components of security platform 122 (whether individually or in cooperation with third party components) may cooperate to perform that task. As one example, security platform 122 can optionally perform static/dynamic analysis in cooperation with one or more virtual machine (VM) servers, such as VM server 124.

An example of a virtual machine server is a physical machine comprising commercially available server-class hardware (e.g., a multi-core processor, 8+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 122, but may also be provided by a third party. As one example, the virtual machine server can rely on EC2, with the remainder portions of security platform 122 provided by dedicated hardware owned by and under the control of the operator of security platform 122. VM server 124 is configured to provide one or more virtual machines 126-128 for emulating client devices. The virtual machines can execute a variety of operating systems and/or versions thereof. Observed behaviors resulting from executing applications in the virtual machines are logged and analyzed (e.g., for indications that the application is malicious). In some embodiments, log analysis is performed by the VM server (e.g., VM server 124). In other embodiments, analysis is performed at least in part by other components of security platform 122, such as a coordinator 144.

In various embodiments, security platform 122 makes available the results of its analysis of samples via a list of signatures (and/or other identifiers) to data appliance 102 (and/or to MDM server 162) as part of a subscription. For example, security platform 122 can periodically send a content package that identifies malware apps (e.g., daily, hourly, or some other interval, and/or based on an event configured by one or more policies). An example content package includes a listing of identified malware apps, with information such as a package name, a hash value for uniquely identifying the app, and a malware name (and/or malware family name) for each identified malware app. The subscription can cover the analysis of just those files intercepted by data appliance 102 and sent to security platform 122 by data appliance 102, and can also cover signatures of all malware known to security platform 122 (or subsets thereof, such as just mobile malware but not other forms of malware (e.g., PDF malware)).

In various embodiments, security platform 122 is configured to provide security services to a variety of entities in addition to (or, as applicable, instead of) an operator of data appliance 102. For example, other enterprises, having their own respective enterprise networks 134 and 138, and their own respective data appliances 136 and 148, can contract with the operator of security platform 122. Other types of entities can also make use of the services of security platform 122. For example, an Internet Service Provider (ISP) providing Internet service to client device 110 can contract with security platform 122 to analyze applications which client device 110 attempts to download. As another example, the owner of client device 110 can install software 114 on client device 110 which communicates with security platform 122 (e.g., to receive content packages from security platform 122 and transmit applications to security platform 122 for analysis).

III. Automated Extraction and Classification of Malicious Indicators

Detecting online criminal activity can be challenging for a variety of reasons, including the diversity of malicious activities and the scale of the problem, where billions of potential indicators of compromise (IOCs) such as Internet Protocol (IP) addresses, domain names, Uniform Resource Locators (URLs), and file hashes (e.g., SHA256 or MD5) may exist and be usable to identify and stop malicious activity. To help address the seemingly insurmountable task of identifying IOCs, security researchers often share their discoveries with one another. Unfortunately, such information sharing among researchers is not standardized or centralized, posing two main challenges to researchers. The first challenge is how to locate sources of publicly shared potential IOCs. The second challenge is that, without a universal definition of IOC, malicious IOCs may be intermingled with benign indicators.

To address these and other problems, in various embodiments, security platform 122 includes an automated IOC extraction system 300 that can collect and classify IOCs automatically. As will be described in more detail below, IOC extraction system 300 curates existing and discovers new IOC sources, crawls those sources and extracts potential IOCs, collects IOC intelligence, and classifies IOCs. As used herein, a "true IOC," "confirmed IOC," "malicious IOC," and/or "actionable IOC" is an IOC that can be used to block malicious/other undesirable activities. A "candidate IOC" or "potential IOC" is one that has not yet been determined to be usable to stop malicious/other undesirable activities. A "false IOC" is a candidate IOC that is subsequently determined to be benign (or not otherwise usable to stop malicious/other undesirable activities).

A. Example Architecture

Automated IOC extraction system 300 supports both manual and automated addition of various IOC sources, including websites, blogs, RSS feeds, Twitter posts, and/or threat intelligence sharing platforms. As one example, system 300 can identify new sources by leveraging TF-IDF based scoring to decide if a source is a publisher of malicious IOCs. An initial seed of sources can be used to build a term frequency model of the natural language present in known computer security related IOC sources and to build an inverse document frequency representing documents in general. In the example of Twitter, a search API can be used to find potentially useful sources which can then be evaluated using the average TF-IDF score of feeds to decide whether a given feed should be added as a source.

Each type of source (e.g., blog or Twitter) is crawled with an applicable stateful crawler that maintains a visit history for each source individually and stores collected content in a raw format for processing. When the web crawler encounters a link, it can be added to a crawl queue. System 300 extracts user-readable text from the collected raw content (e.g., HTML, PDF, DOCX, etc.). Using natural language processing, the text is converted into a list of sentences. Candidate IOCs (URLs, domain names, IP addresses, email address, file hashes, etc.) are extracted from the list of sentences. The sentence (or other surrounding text) from which a given candidate IOC is extracted is referred to as the IOC's "context," which can be used to locate interesting computer security terms related to the IOC. Additional information related to the candidate IOC is also collected, such as blocklists that the IOC appeared in and DNS records associated with the IOC, and can be used to assist in determining whether the candidate IOC is an indicator of abuse by itself. In various embodiments, system 300 leverages both a heuristic ruleset based classifier, and a machine learning classifier to decide whether a potential IOC is actionable (i.e., can be used for blocklisting by itself). Both classifiers rely on features based on the IOC's context, attributes of the source, and additional intelligence gathered about the IOC (described in more detail below). The output of system 300 can be used in a variety of ways (e.g., providing a list of IOCs to URL classification service 276, to data appliance 102, etc.).

Figure 3:
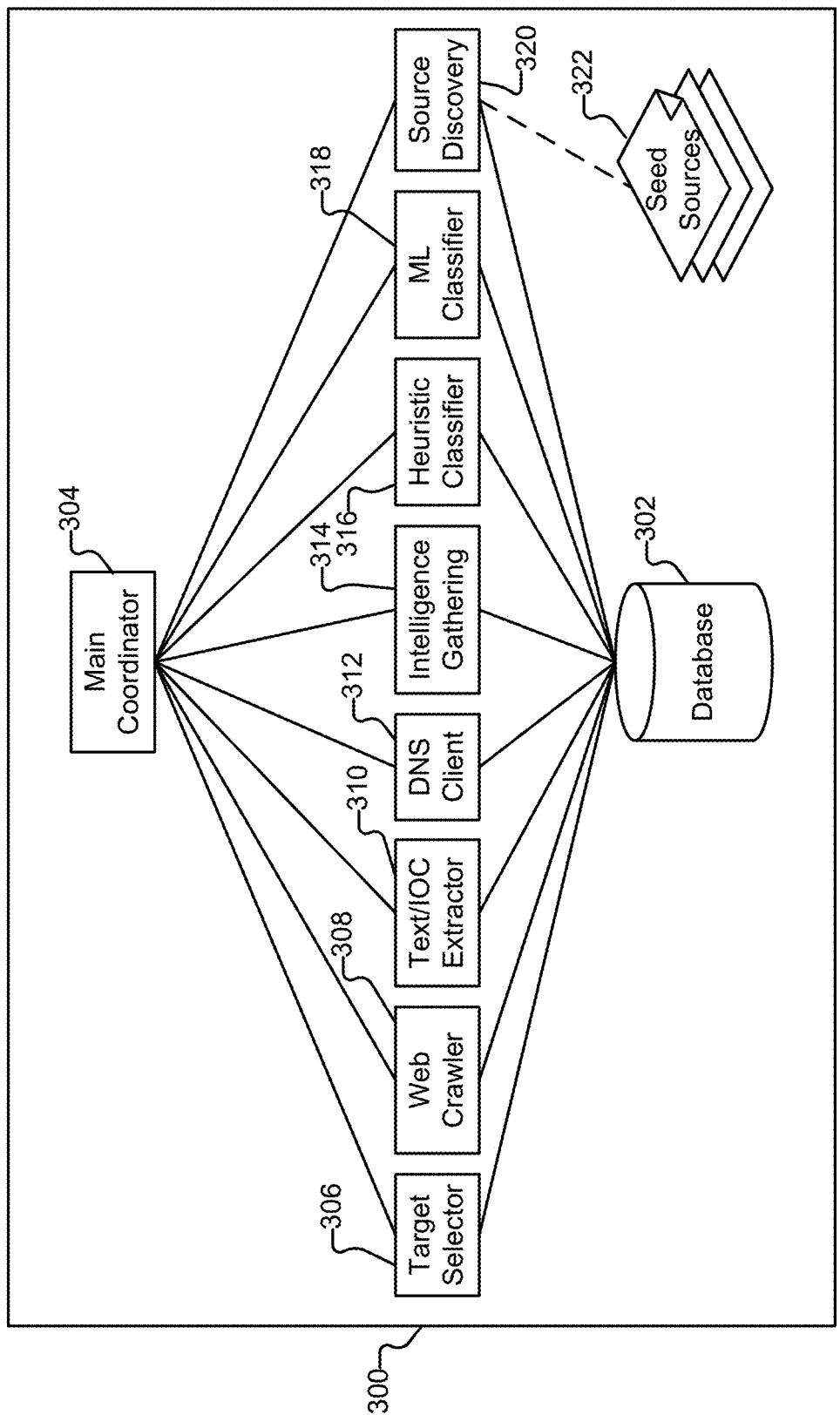
FIG. 3 illustrates an embodiment of an automated indicator of compromise extraction system.

FIG. 3 illustrates an embodiment of an automated IOC extraction system. System 300 is modular, with each component working separately and modules depending on each other through data stored in central database 302 (or, as applicable, via RAM). One example of database 302 is a relational database (e.g., MySQL) for data persistence. Database 302 can be normalized to make sure that the same content is not stored multiple times. In various embodiments, for each source (e.g., blog website, Twitter account, etc.), the crawling state (URLs visited and URLs to visit) is stored in a JSON format (e.g., as a byte array or other appropriate way).

Main coordinator 304 orchestrates when and how each module is run, and multiple instances of a particular module (e.g., web crawler 308) may be run simultaneously. Components of system 300 can be implemented in a variety of ways (e.g., as a set of scripts authored in an appropriate programming/scripting language such as Java or python and using applicable libraries such as the NLTK python library for natural language processing, the Requests python library for scraping websites, and scikit-learn for machine learning).

Target selector 306 is configured to select and prioritize sources (e.g., URLs, RSS feeds, and Twitter accounts) to be crawled. It caps the number of resources that crawlers visit in a certain time frame for a specific source. Web crawler 308 crawls targets selected by target selector 306. It collects all online documents found visiting a particular URL. Examples of documents include text, HTML, PDF, DOCX, XLSX, pictures, and other types of files. Web crawler 308 also visits URLs that may not be part of a source. As one example, IOCs are frequently posted to the site www-.pastebin.com, which web crawler 308 may also visit.

Text/IOC extractor 310 comprises multiple parts. First, it extracts text from files collected by web crawler 308. It can handle different file formats (e.g., HTML, PDF, etc.). Second, it leverages natural language processing (NLP) to retrieve sentences from text. Third, it reverse defangs and retrieves candidate IOCs from the sentences using regular expressions, and fourth, it validates whether the candidate IOCs are valid domain names, IP addresses, email addresses, etc. Browsers and other web and email clients often make URLs, IP addresses, email addresses, and/or domain names clickable. IOCs are often intentionally made unclickable to stop readers from inadvertently visiting dangerous resources, a process referred to as "defanging." An example of a defanged URL is "hXXPs[:]//malicious.url[.]com/install.exe." When a defanged IOC is encountered, system 300 can reverse the defanging process ("reverse defanging") to obtain the original IOC.

DNS client module 312 queries DNS to find resource records (e.g., IP address and name servers) associated with candidate IOCs. These resource records can be leveraged to identify if a candidate IOC is truly an IOC. Intelligence gathering module 314 queries online resources about candidate IOCs. As one example, this module queries blocklists to find out whether a candidate IOC is included on such lists. The information collected can be used to determine whether a candidate IOC is a true IOC.

Heuristic classifier 316 includes a set of rules to decide whether a candidate IOC should be deemed a true IOC or not. Suppose a candidate IOC is classified as a true IOC. In that case, it will be included in the different services (e.g., offered by security platform 122) to block malicious activities (e.g., URL filtering and DNS security services). If a candidate IOC is not classified as a true IOC, then it can be sent to other maliciousness detectors (e.g., malware/phishing detectors). The heuristic classifier leverages a subset of the features that machine learning classifier 318 uses. For example, it leverages knowledge of whether an IOC was defanged, was included in third-party blocklists (e.g., as can be determined by querying VirusTotal or other appropriate source), what DNS resource records the DNS client collected, the type of the IOC (e.g., URL, domain, IP), and whether the context included certain words indicating that the source authors thought this IOC to be malicious. A candidate IOC that appears on multiple blocklists and is defanged is likely to be malicious. Therefore, an example rule could be if a candidate IOC is defanged, and it appears on more than three blocklists, then it is a true IOC.

An advantage of a machine learning classification is that it can automatically learn a large number of rules based on a large set of features that would be untenable for humans. A disadvantage of machine learning is that it depends on the availability of labeled data. A heuristic classifier can be used to hardcode important rules based on expert knowledge. A variety of techniques can be used to implement machine learning classifier 318. As one example, a random forest model can be used.

Machine learning classifier 318 is involved in three main tasks. The first task is feature extraction (e.g., how many sources mentioned the IOC, the age of the IOC, whether the IOC was defanged), for example, from the context of IOCs, the candidate IOCs themselves, and any external intelligence collected.

In various embodiments, features used by machine learning classifier 318 can be grouped into the following categories: features specific to the IOC string, the sources the IOC was mentioned in, the context sentences, the context contents (e.g., blog posts or tweets), and a set of external features.

IOC Textual Features: The goal of textual features is to understand how a candidate IOC looks. Often, these features are indicative of malice themselves. For example, complex domains and URLs might be constructed to trick users. These features are derived directly from the IOC string. Examples of such features include:
- Character length of the IOC
- Type of the IOC (e.g., domain, IP, URL, email address, hash) integer encoded
- Number of domain levels
- Number of URL path levels
- Length of the URL query field
- Was it extracted as part of a longer IOC (e.g., domain/IP part from URL)

Source Features: Source features represent how the security community at large thinks about an IOC. The more sources that mention a defanged IOC, the more likely it is that the IOC is malicious. Examples of such features include:
- The number of times the IOC was mentioned defanged across all sources
- The unique number of techniques used to defang the IOC across all sources
- Methods used to defang the IOC across all sources, one-hot encoded
- The number of source types an IOC was mentioned in (e.g., blog, Twitter, RSS)
- Source Distribution related features: These features are calculated four times, once for the source, once for the affiliation. For both, it is also calculated only when the IOC was defanged:
  - The maximum number of times the IOC was mentioned in one source/affiliation
  - The total number of times the IOC was mentioned in sources/affiliations
  - Max in one source/affiliation divided by total mentions to see if an IOC is mentioned in one source/affiliation much more than in others
  - The total number of sources/affiliations the IOC was mentioned in Sentence features: Some sentence features also represent how the security community, in general, thinks about an IOC. Other sentence features represent whether a given sentence likely talks about a real IOC. For an IOC, each context sentence (and contents) can be considered, that is, all sentences (and contents) where the IOC was mentioned. For example, if a URL IOC is found in a sentence with the word "phishing," it might indicate that the URL is a phishing URL. Similarly, if a sentence contains many candidate IOCs, then it is more likely that this sentence is about true IOCs. Examples of such features include:
- One-hot encoding of computer, network, or security-related keywords found in the context sentences. Examples of such words include: "cookies," "download," "data," "malware," and "C2."
- One-hot encoding of the token types found in the sentences
- Minimum, average, and maximum values of the following features among context sentences:
  - Sentence length
  - Ratio of letters to all characters
  - Ratio of special terms
  - Ratio of IOCs
  - Number of ways IOCs were defanged
  - Number of IOCs
  - Number of defanged IOCs Content features: Content features are similar to sentence features, but they are calculated for entire posts (or otherwise across a document). For example, the average number of IOCs present in context contents (instead of context sentences) for a given IOC is calculated. Context content features are calculated the same way as for context sentences.

External features: Features collected from external sources, which might help decide if a candidate IOC is a true IOC, can also be leveraged. As one example, the stable Alexa rank of candidate IOCs can be used as popular domains are not likely to be true IOCs. Alexa ranks domain names based on popularity. Alexa ranks of domain names can be collected and a determination can be made of whether the domains maintain their ranks for a long time period as a stable Alexa rank. The number of blocklists an IOC candidate was included in can also be considered. DNS client 312's output indicates if a domain is non-existent (NX), which would also make it likely that it is a true IOC. Finally, the age of domain names can be considered, as new domains are more likely to be malicious.

A second task performed by machine learning classifier 318 is model selection. This includes training a classifier model (e.g., random forest) on labeled data. An example of labeled data is a list of candidate IOCs where it is known whether they are true or false IOCs. The labeled data can be split into three parts: training, development, and validation sets. The training data can be used to help the classifier learn the difference between true and false IOCs. However, there are many hyperparameters that the classifier cannot learn (e.g., in the case of random forest, the maximum allowed depth of the trees or the number of features that can be used for each tree). The development dataset can be used to see how different settings of hyperparameters affect the classifier's performance. One approach is to consider how good a classifier's recall is for a predefined precision (e.g., 0.99). Recall is a measure of the percent of true IOCs that the classifier can find (the number of true positives divided by the number of true positives plus false negatives). A true positive is where a candidate IOC is classified as a true IOC and was indeed a true IOC. A false negative is where a candidate IOC is classified as a false IOC but was in fact a true IOC. Precision is a measure of how often the classifier correctly determines that a candidate IOC is a true IOC (e.g., the number of true positives divided by the number of true positives plus false positives). Precision is important in limiting the number of false positives. A false positive is where a candidate IOC is erroneously classified as a true IOC when it was a false IOC. The validation set can be used to make sure that the classifier did not overfit on the training and development datasets and that it can be used in practice with good performance. The final task is using a selected model to classify new candidate IOCs as true or false IOCs. True IOCs can then be included in the different services offered by security platform 122 to block malicious activities, as with heuristic classifier results.

In various embodiments, automated IOC extraction system 300 also includes an automatic source discovery module 320. It leverages a manually curated set of seed sources 322 and online information to discover new sources automatically. Source discovery module 320 achieves this in two steps. First, sources that are related to security are aggressively included. Second, sources that do not yield valuable information are removed. Different techniques can be leveraged for different kinds of sources. In the case of blogs, for example, a search engine can be used to locate security blogs, and then database 302 can be searched to determine how often sources (starting with the seed) have linked to these blogs. If multiple sources are linked to a given blog, it can be included in the list of sources. In the case of Twitter, user accounts that are followed by seed sources (e.g., accounts of security researchers, security companies, etc.) can be identified and included (e.g., the ones that are followed by the highest number of sources, are followed by a threshold number of seed accounts, etc.). Unfortunately, aggressively including many sources can lead to an ineffective system to collect IOCs over time. One way to address this issue is to periodically run source evaluation. If it is determined that a source did not recently provide actionable IOCs, the source can be removed. The source can be automatically added back to system 300 at a later time (if applicable) through subsequent automatic discovery.

B. Example Processing

Figure 4:
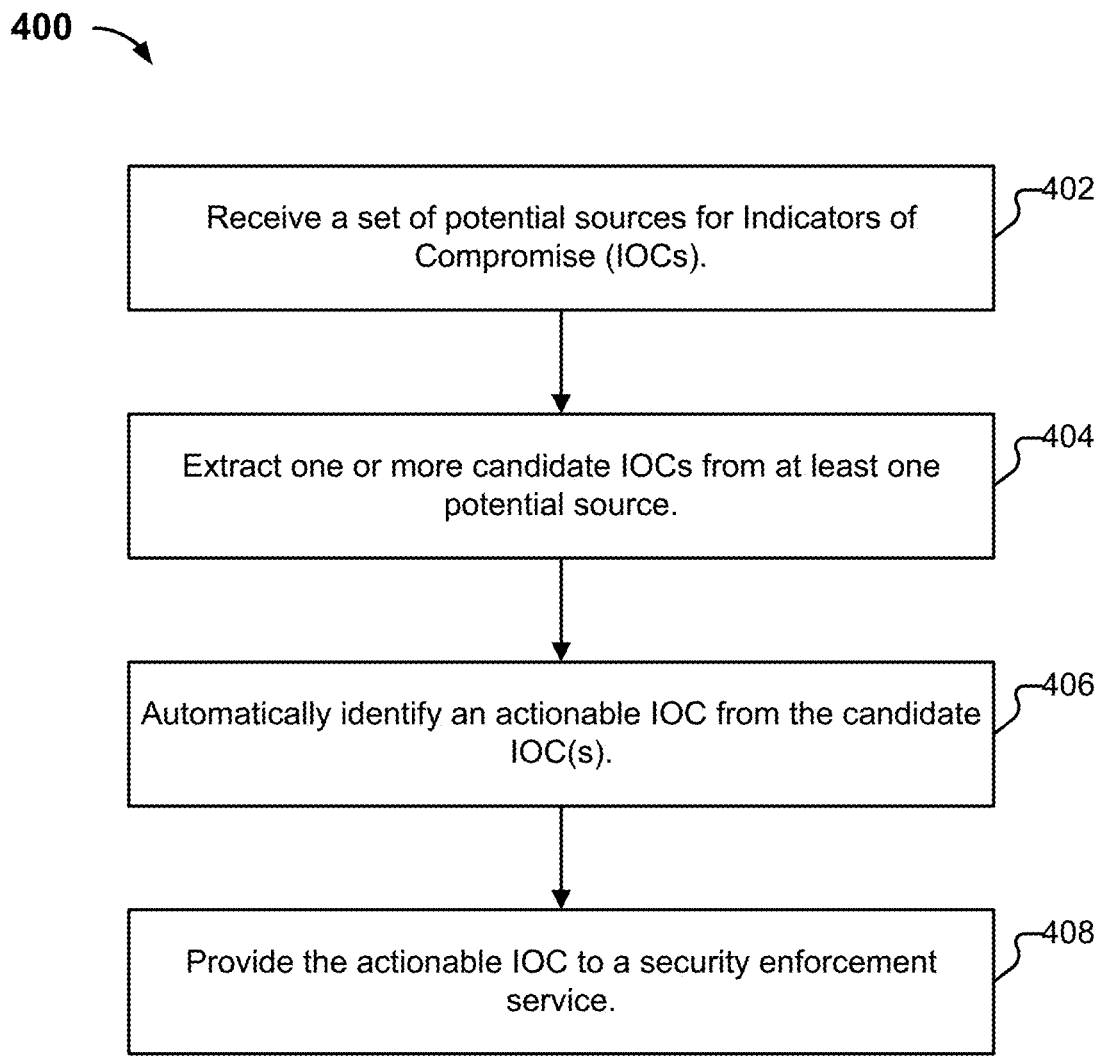
FIG. 4 illustrates an embodiment of a process for generating actionable indicators of compromise.

FIG. 4 illustrates an embodiment of a process for generating actionable indicators of compromise (e.g., IOCs that can be provided to a production security enforcement system and used to prevent harm). In various embodiments, process 400 is performed by security platform 122, and in particular by automated IOC extraction system 300. Process 400 begins at 402 when a set of potential sources for indicators of compromise (IOCs) is received. As one example, target selector 306 receives a set of potential sources at 402. At 404, one or more candidate IOCs is extracted from at least one of the potential sources. As one example, web crawler 308 and text/IOC extractor 310 collectively extract a set of candidate IOCs at 404. At 406, an actionable IOC is automatically identified. As an example, such identification can be performed at 406 by heuristic classifier 316 and/or machine learning classifier 318. Finally, at 408, the actionable IOC is provided to a security enforcement service. As one example, an actionable IOC is provided by automated IOC extraction system 300 to URL classification service 276. As another example, an actionable IOC is provided by automated IOC extraction system 300 to data appliance 102 (e.g., via a subscription service provided by security platform 122). Various remediation techniques described above (e.g., preventing client 104 from communicating with a domain, quarantining client 106 if it is determined that client 106 has communicated with the domain, etc.) can be taken based on the IOC.

1. Blog Post Example

Suppose that one source included in seed sources 322 is a blog called "Malware Busters." A file for the source (a seed file) contains the name of the blog and a URL to the main page of the blog: "www.malwarebusters.com." When target selector 306 is called, it will load the seed file and save the URL of the main page with the name of the blog to database 302. Two lists are maintained for each source: "visited URLs" and "URLs to visit." Initially, the "URLs to visit" will include a single link—to the main page (www.malwarebusters.com). And, initially, the "visited URLs" list will be empty, and is maintained to make sure that the same blog posts are not visited multiple times. The exception is the main page of the blog, which is revisited periodically (e.g., every day).

Next, multiple web crawlers 308 in parallel will begin retrieving URLs from the "URLs to visit" list. In this example, starting with www.malwarebusters.com, they will download the main page of the blog and add all the URLs referencing blog posts to the "URLs to visit" list. They will continue visiting these URLs until a daily cap is reached. Suppose that one of the pages crawled is a post about a phishing campaign that targets a bank, "Rainbow Bank." The page is located at http://malwarebusters.com/posts/rainbowphishing.html. An example of a portion of user-visible text from the page is shown in FIG. 5A. The corresponding source code for the page excerpt is shown in FIG. 5B. When web crawler 308 visits the page, it will first save the raw HTML file with HTML, JavaScript, and CSS code. It will also process the HTML file and retrieve links from it, such as "https://pastebin.com/cWKZ98xx" in two cases only: if the URL is part of the blog site or the domain portion is in a predefined list such as "pastebin.com." The retrieved links are then added to the "URLs to visit" list.

Text/IOC extractor 310 will start by extracting the user-visible text as seen in FIG. 5A. Then, it will split the text into sentences using NLP. While the crawlers save the raw HTML files, this module will save the user-visible text and the extracted sentences to database 302. Next, using regular expressions, extractor 310 will search for defanging and will reverse defang candidate IOCs, taking note of where and what kind of defanging took place in the sentences. (In this example, "ralnbowbank[.]com" will be transformed to "ralnbowbank.com".) After defanging, another set of regular expressions is used to look for candidate IOCs and extract them, noting their position in the sentence. Before saving them to database 302, a check is made to see if they are valid domain names, URLs, IPs, and/or email addresses. After this step, the output looks similar to the following table:

| IOC | Defanging Type | Type | Is Child | Related Sentences |
|---|---|---|---|---|
| rainbowbank.com | none | domain | no | sent3, sent4 |
| ralnbowbank.com | [.] | domain | no | sent5 |
| rainb0wbank.com | [.] | domain | no | sent5 |
| pastebin.com | none | domain | yes | sent9 |
| https://pastebin.com/cWKZ98xx | none | URL | no | sent9 |

Next, DNS client module 312 will query the IP address and the name server record of the domains found. Intelligence gathering module 314 will find that ralnbowbank.com is present on four blocklists while rainb0wbank.com is not present in any blocklists. It will also find that both domains are relatively new.

Heuristic classifier 316 will then process the candidate IOCs. For example, heuristic classifier 316 will classify ralnbowbank.com as a true IOC as it has appeared on multiple blocklists, it was defanged, it appears with the word "typosquatting," and it is a domain name. Therefore, ralnbowbank.com will be included in security services to be blocked when visited by users or connected to by machines. Candidate IOCs rainbowbank.com, pastebin.com, and https://pastebin.com/cWKZ98xx are in a whitelist. Thus, they will be deemed as false IOCs. Another example of a domain that can be included in such a whitelist is "docs.google.com." Many benign documents are reachable via docs.google.com, as are some malicious documents. By including "docs.google.com" in a whitelist, system 300 can be prevented from inadvertently generating an actionable IOC that would block all documents reachable via docs.google.com (as opposed to a more fine-grained URL pointing at a specific document or user account which could be an acceptable actionable IOC such as docs.google.com/kj235kjsdf78235kasrfh).

Suppose that in the case of rainb0wbank.com, heuristic classifier 316 is unable to decide if it was a true or a false IOC; therefore, it will send it for further analysis (e.g., to machine learning classifier 318 and/or other detectors (e.g., a phishing detector)).

For machine learning classifier 318, multiple kinds of features will be extracted about rainb0wbank.com. Some example features include the ratio of IOCs to text in the context sentences, the number of defanged IOCs, the number of blogs mentioning and defanging the IOC, and the number of IOCs in the entire blog post. As machine learning classifier 318 finds that most defanged IOCs at malware-busters.com are true IOCs and that rainb0wbank.com was also mentioned on another site (tocatchaphisher.xyz), it will classify it to be a true IOC.

2. Twitter Example

In this example, suppose that the Twitter account of a known security researcher, Alice (@sec_alice123), is included as a source for automated IOC extraction system 300. Alice tweets the following message: "We found some very tricky ransomware hosted on compromised sites. I attached a picture of related IOCs. They seem to be part of a social engineering campaign. When users download them, kaboom! Their files are encrypted." Included with the tweet is an image containing the following defanged URLs:

hXXps[:]//antivirus.victim[.]site/download/me/clean-your-pc.exe?id=dr524lkr0dl and
hXXp[:]//virus-cleaner.victim2[.]site/remove/malware/removal.exe?ref=m37x8l2la The process of extracting the IOCs is similar to the example as described above. However, this time the attached picture needs to be separately downloaded so that the text can be extracted using optical character recognition (OCR). In the case of these two URLs, machine learning classifier 318 might find that they are true IOCs since they are defanged, the URLs are complex (they have several components and are relatively long), and the text to IOC ratio is high in the text extracted from the picture.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
   receive a set of potential sources for Indicators of Compromise (IOCs), wherein at least one potential source included in the set is a social media account, and where the social media account comprises a set of one or more posts, at least one of which posts does not contain an IOC;
   extract one or more candidate IOCs from at least one source included in the set of potential sources, including by determining a context for a given candidate IOC using text surrounding the given candidate IOC;
   automatically identify an actionable IOC from the one or more candidate IOCs; and
   provide the actionable IOC to a security enforcement service; and
   a memory coupled to the processor and configured to provide the processor with instructions.

2. The system of claim 1, wherein the processor is further configured to identify a new potential source to add to the set of potential sources.

3. The system of claim 2, wherein the new potential source corresponds to a source previously removed from the set of potential resources during a source evaluation.

4. The system of claim 1, wherein extracting the one or more candidate IOCs includes performing optical character recognition on an image.

5. The system of claim 1, wherein the processor is configured to periodically crawl the set of potential sources.

6. The system of claim 1, wherein automatically identifying the actionable IOC includes analyzing the one or more candidate IOCs using a rule-based classification.

7. The system of claim 1, wherein automatically identifying the actionable IOC includes analyzing the one or more candidate IOCs using a machine learning-based classification.

8. The system of claim 1, wherein automatically identifying the actionable IOC includes excluding as a candidate IOC a whitelisted domain.

9. The system of claim 8, wherein the domain is whitelisted based at least in part on a popularity metric.

10. The system of claim 1, wherein at least one candidate IOC comprises a domain.

11. The system of claim 1, wherein at least one candidate IOC comprises a URL.

12. The system of claim 1, wherein at least one candidate IOC comprises an IP address.

13. The system of claim 1, wherein at least one candidate IOC comprises an email address.

14. The system of claim 1 wherein at least one candidate IOC comprises a hash.

15. The system of claim 1, wherein at least one processor is further configured to prune the set of potential sources.

16. A method, comprising:
   receiving a set of potential sources for Indicators of Compromise (IOCs), wherein at least one potential source included in the set is a social media account, and where the social media account comprises a set of one or more posts, at least one of which posts does not contain an IOC;
   extracting one or more candidate IOCs from at least one source included in the set of potential sources, including by determining a context for a given candidate IOC using text surrounding the given candidate IOC;
   automatically identifying an actionable IOC from the one or more candidate IOCs; and
   providing the actionable IOC to a security enforcement service.

17. The method of claim 16, further comprising identifying a new potential source to add to the set of potential sources.

18. The system of claim 17, wherein the new potential source corresponds to a source previously removed from the set of potential resources during a source evaluation.

19. The method of claim 16, wherein extracting the one or more candidate IOCs includes performing optical character recognition on an image.

20. The method of claim 16, further comprising periodically crawling the set of potential sources.

21. The method of claim 16, wherein automatically identifying the actionable IOC includes analyzing the one or more candidate IOCs using a rule-based classification.

22. The method of claim 16, wherein automatically identifying the actionable IOC includes analyzing the one or more candidate IOCs using a machine learning-based classification.

23. The method of claim 16, wherein automatically identifying the actionable IOC includes excluding as a candidate IOC a whitelisted domain.

24. The method of claim 23, wherein the domain is whitelisted based at least in part on a popularity metric.

25. The method of claim 16, wherein at least one candidate IOC comprises a domain.

26. The method of claim 16, wherein at least one candidate IOC comprises a URL.

27. The method of claim 16, wherein at least one candidate IOC comprises an IP address.

28. The method of claim 16, wherein at least one candidate IOC comprises an email address.

29. The method of claim 16, wherein at least one candidate IOC comprises a hash.

30. The method of claim 16, further comprising pruning the set of potential sources.

31. A computer program product embodied in a non-transitory computer readable medium and comprising computer instructions for:
- receiving a set of potential sources for Indicators of Compromise (IOCs), wherein at least one potential source included in the set is a social media account, and where the social media account comprises a set of one or more posts, at least one of which posts does not contain an IOC;
- extracting one or more candidate IOCs from at least one source included in the set of potential sources, including by determining a context for a given candidate IOC using text surrounding the given candidate IOC;
- automatically identifying an actionable IOC from the one or more candidate IOCs; and
- providing the actionable IOC to a security enforcement service.

* * * * *